(12) United States Patent
Dudar (10) Patent No.: US 10,087,857 B2
(45) Date of Patent: Oct. 2, 2018

(54) SECONDARY SYSTEM AND METHOD FOR CONTROLLING AN ENGINE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 15/264,291

(22) Filed: Sep. 13, 2016

(65) Prior Publication Data

US 2018/0073448 A1   Mar. 15, 2018

(51) Int. Cl.
| | | |
|---|---|---|
| *F02D 41/00* | (2006.01) | |
| *F02D 41/26* | (2006.01) | |
| *F02D 41/22* | (2006.01) | |
| *F02M 25/08* | (2006.01) | |

(52) U.S. Cl.
CPC ......... *F02D 41/004* (2013.01); *F02D 41/221* (2013.01); *F02D 41/26* (2013.01); *F02M 25/0836* (2013.01); *F02M 25/0854* (2013.01); *F02D 2200/04* (2013.01); *F02D 2200/602* (2013.01)

(58) Field of Classification Search
CPC ...... F02D 41/004; F02D 41/221; F02D 41/26; F02D 2200/04; F02D 2200/602; F02M 25/0854; F02M 25/0836
See application file for complete search history.

(56) References Cited

U.S. PATENT DOCUMENTS

| | | | | |
|---|---|---|---|---|
| 4,414,952 A | * | 11/1983 | Fried ....................... | F02B 33/42 123/559.2 |
| 4,705,007 A | * | 11/1987 | Plapp ..................... | F02M 25/06 123/519 |
| 4,934,476 A | * | 6/1990 | Hyodo ................. | B60K 31/107 123/360 |
| 5,245,973 A | * | 9/1993 | Otsuka ............... | F02M 25/0854 123/198 D |
| 5,367,997 A | * | 11/1994 | Kawamura ............. | F02D 11/10 123/399 |
| 5,445,015 A | * | 8/1995 | Namiki .............. | F02M 25/0809 123/520 |
| 5,469,832 A | * | 11/1995 | Nemoto .............. | F02D 41/0045 123/518 |
| 5,619,976 A | * | 4/1997 | Kitagawa ............ | F02D 41/1402 123/679 |

(Continued)

OTHER PUBLICATIONS

Dudar, Aed M., "Secondary System and Method for Controlling an Engine," filed Sep. 13, 2016, U.S. Appl. No. 15/264,350, 30 pages.

*Primary Examiner* — Hung Q Nguyen
*Assistant Examiner* — Brian P Monahon
(74) *Attorney, Agent, or Firm* — Julia Voutyras; McCoy Russell LLP (57) ABSTRACT

Systems and methods for operating an engine in response to a condition of an engine air intake throttle being degraded are presented. In one example, the engine air intake throttle is held closed while a position of a fuel vapor storage canister vent valve is adjusted to control air flow into the engine based on a position of an accelerator pedal. In this way, the engine air amount may be adjusted to provide additional torque from an engine while a throttle is degraded.

20 Claims, 4 Drawing Sheets

(56) References Cited

U.S. PATENT DOCUMENTS

| | | | | |
|---|---|---|---|---|
| 5,758,306 A * | 5/1998 | Nakamura | B60K 31/047 | 180/170 |
| 5,758,628 A * | 6/1998 | Wada | F02D 41/0032 | 123/198 D |
| 6,009,367 A * | 12/1999 | Hori | B60K 31/107 | 123/350 |
| 6,047,692 A * | 4/2000 | Toyoda | F02M 25/0827 | 123/516 |
| 6,129,071 A * | 10/2000 | Pursifull | F02D 9/1015 | 123/337 |
| 6,227,177 B1 * | 5/2001 | Yamafuji | F02D 41/0042 | 123/399 |
| 6,575,146 B1 * | 6/2003 | Kanai | B60K 6/365 | 123/520 |
| 7,234,450 B1 * | 6/2007 | Takakura | F02D 41/0045 | 123/494 |
| 2002/0161495 A1 * | 10/2002 | Yamaki | G01M 15/05 | 701/33.8 |
| 2002/0174850 A1 * | 11/2002 | Kanai | F02D 11/107 | 123/336 |
| 2003/0074958 A1 * | 4/2003 | Nagasaki | F02M 25/0818 | 73/114.41 |
| 2004/0040537 A1 * | 3/2004 | Esteghlal | F02M 25/0809 | 123/339.11 |
| 2004/0112119 A1 * | 6/2004 | Watanabe | F02M 25/0809 | 73/40 |
| 2007/0157908 A1 * | 7/2007 | Kano | F02M 25/08 | 123/520 |
| 2009/0133673 A1 * | 5/2009 | Amano | B60K 6/48 | 123/520 |
| 2009/0276128 A1 * | 11/2009 | Whitney | F02D 11/107 | 701/54 |
| 2009/0308359 A1 * | 12/2009 | Wang | F02M 25/0836 | 123/520 |
| 2013/0199504 A1 * | 8/2013 | Takeishi | F02M 25/0809 | 123/520 |
| 2013/0233276 A1 * | 9/2013 | Pursifull | F02D 9/02 | 123/337 |
| 2013/0253799 A1 * | 9/2013 | Peters | F02M 25/0818 | 701/102 |
| 2014/0005912 A1 * | 1/2014 | Ide | F02D 41/3005 | 701/104 |
| 2014/0114550 A1 * | 4/2014 | Bohr | F02D 41/0037 | 701/102 |
| 2014/0165972 A1 * | 6/2014 | Aso | F02M 25/0854 | 123/520 |
| 2014/0297161 A1 * | 10/2014 | Stanek | F02D 41/30 | 701/104 |
| 2014/0311446 A1 * | 10/2014 | Whitney | F02D 41/0002 | 123/344 |
| 2014/0316682 A1 * | 10/2014 | Whitney | F02D 11/105 | 701/108 |
| 2015/0159601 A1 * | 6/2015 | Luehrsen | F02M 35/10118 | 123/564 |

* cited by examiner

SECONDARY SYSTEM AND METHOD FOR CONTROLLING AN ENGINE

FIELD

The present description relates to a system and methods for operating an engine during conditions of degradation of a primary engine throttle. The system and methods provide for an alternative way of controlling an engine air amount so that a vehicle in which the engine resides may be driven to while seeking service.

BACKGROUND AND SUMMARY

Air flow into an engine may be controlled via a central or primary throttle that regulates air flow from an air filter of an air intake into an intake manifold and engine cylinders. The throttle may include an electric actuator, such as a motor, to regulate a position of a throttle plate of a butterfly valve. If a driver of the vehicle requests additional engine torque, the throttle opening amount may be increased. If the driver requests less engine torque, the throttle opening amount may be decreased. The throttle may include several sensors to verify that the throttle is performing as desired. If throttle operation is not as desired, it may be determined that the throttle is degraded. The throttle may be adjusted to a closed position where the throttle plate is positioned against a throttle stop when the throttle is determined to be degraded. A predetermined amount of air may pass through the throttle when the throttle is positioned against the stop. The predetermined amount of air allows the vehicle to travel at a very low speed so that the vehicle may be moved off the road it is traveling. Further, if desired, the vehicle may be driven a short distance to allow the driver to seek service for the vehicle. However, if the vehicle is being driven in a rural area, it may take a long period of time before the vehicle reaches an area where the vehicle can be serviced since the amount of engine torque available is low while the throttle plate is positioned against the stop.

The inventor herein has recognized the above-mentioned limitations and has developed an engine control method, comprising: opening a fuel vapor storage canister vent valve and closing a fuel tank vapor blocking valve via a controller in response to an indication of degradation of a throttle that regulates air flow from an engine air intake filter to cylinders of an engine.

By adjusting operating states of devices in a fuel vapor control system, it may be possible to provide the technical result of providing additional air flow to an engine during conditions where a throttle of the engine is degraded so that additional torque may be provided by the engine without having to operate the throttle. For example, the fuel tank vapor blocking valve may be closed and the fuel vapor storage canister vent valve may be opened to prevent fuel vapors from flowing to the engine while air flows to the engine via a passage leading from atmosphere through a fuel vapor storage canister and to the engine intake manifold. Thus, the possibility of over enriching engine cylinders may be mitigated while engine air flow may be increased so that the vehicle may reach a service facility in a timelier manner.

The present description may provide several advantages. In particular, the approach may provide improved vehicle drivability during conditions of throttle degradation. In addition, the approach may be provided with little expense since fuel vapor controls are common. Further, the approach provides for controlling fuel vapors while providing an alternative air flow path that is responsive to driver demands.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
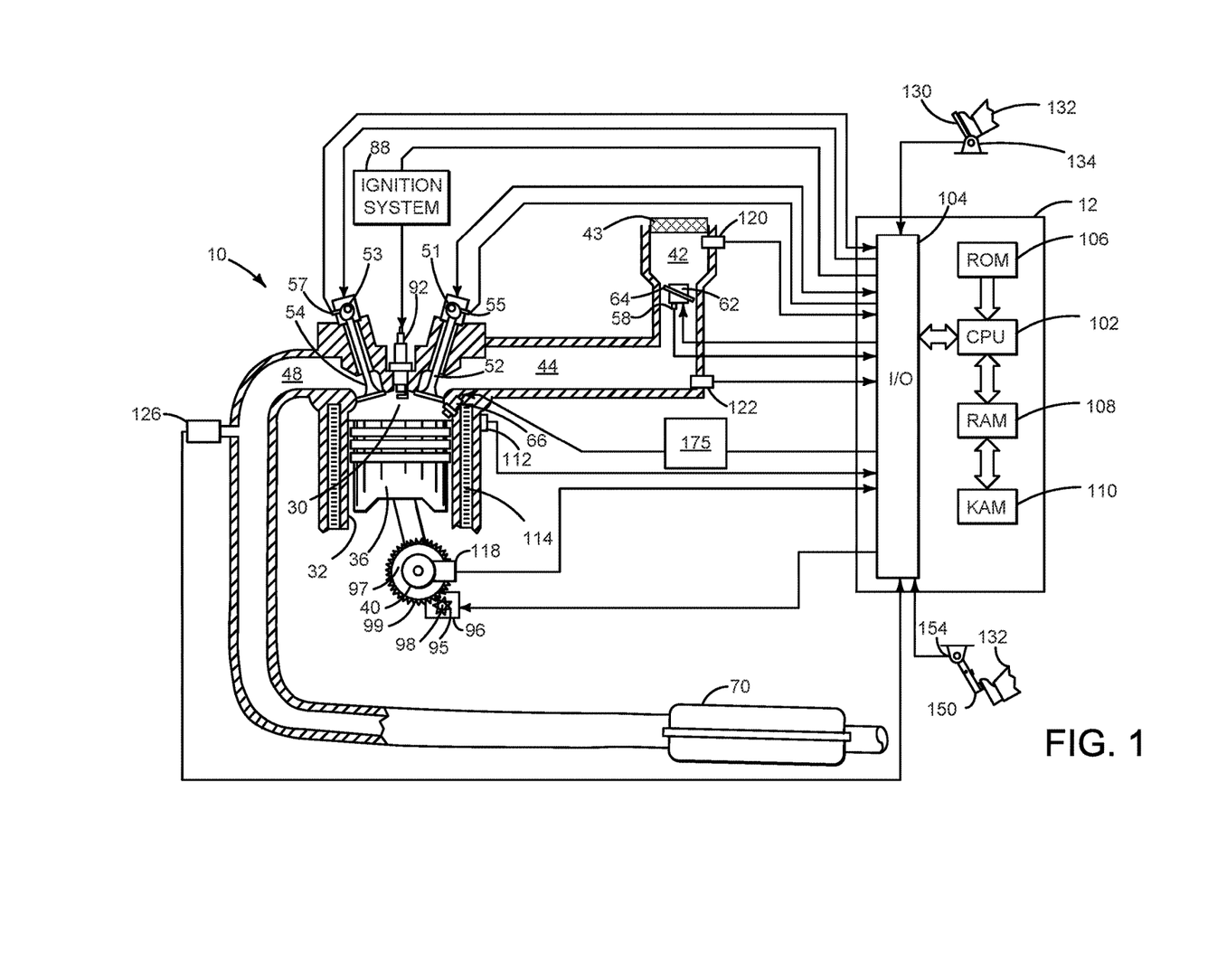
FIG. 1 is a schematic diagram of an engine.
Figure 2:
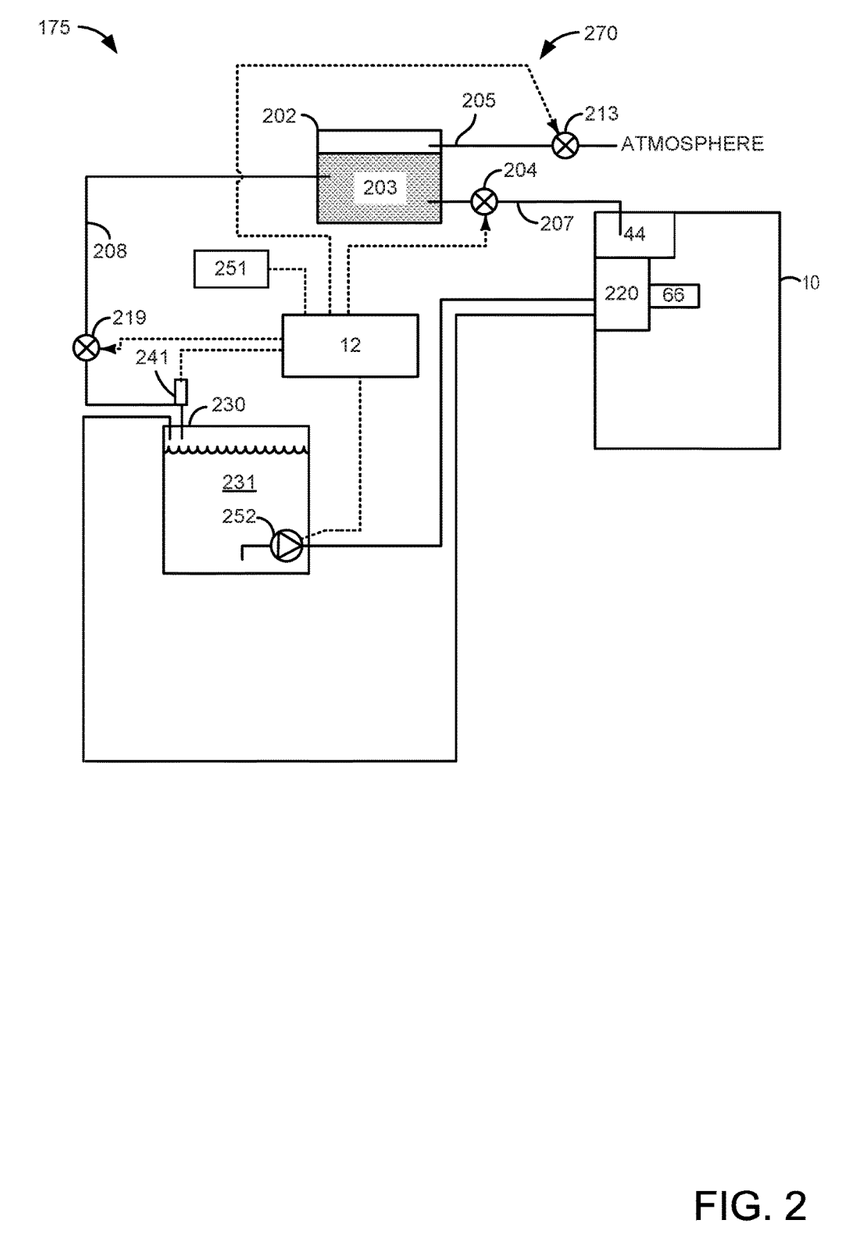
FIG. 2 is a schematic diagram of an example evaporative emissions system.
Figure 3:
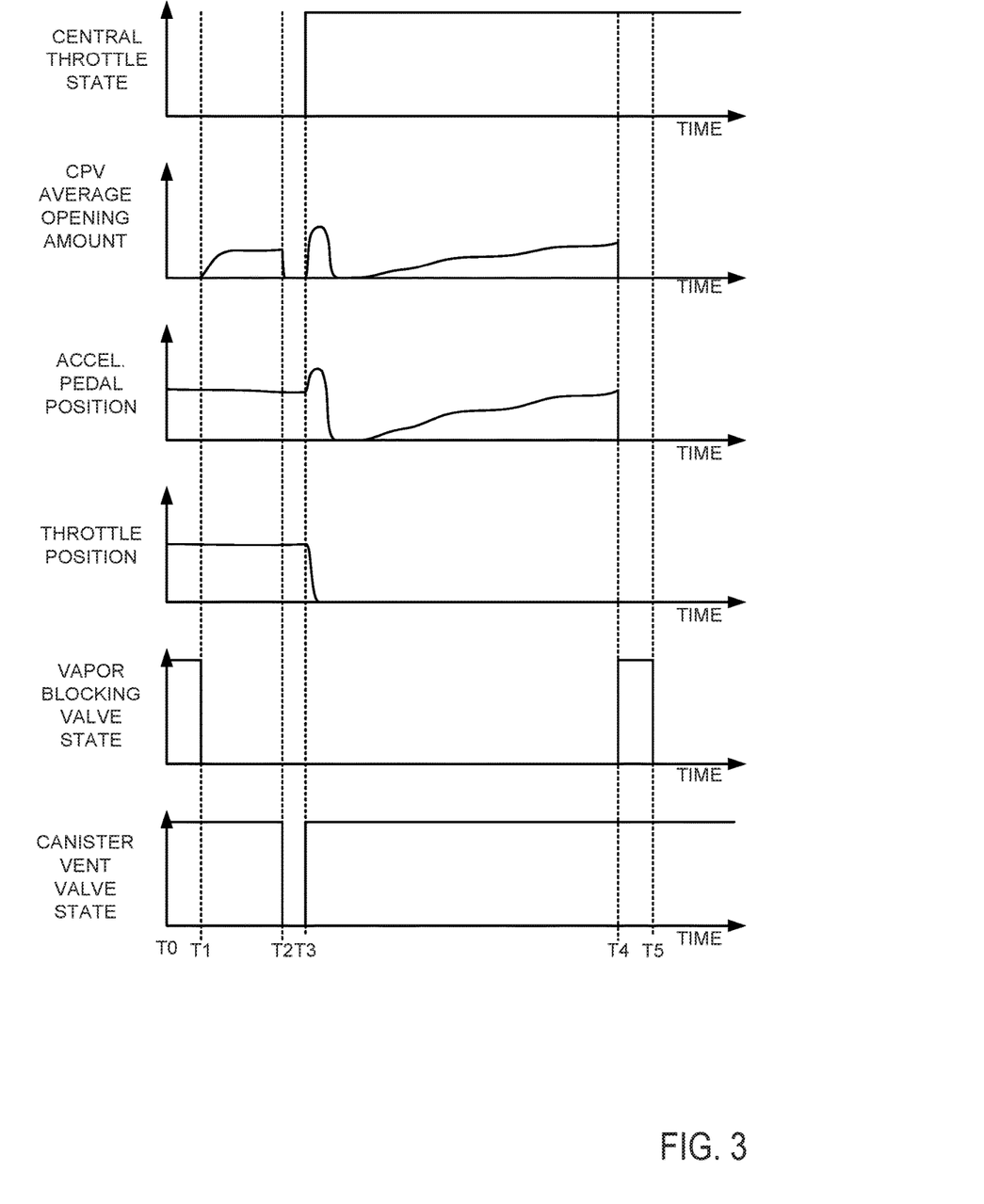
FIG. 3 is a plot of an example prophetic engine operating sequence.

The present description is related to improving engine operation and vehicle drivability during conditions of throttle degradation. A throttle may control air flow through an air filter and engine air intake. The throttle may be included in an engine system as is shown in FIG. 1. The engine may be supplied with fuel vapors from time to time via a fuel vapor control system as is shown in FIG. 2. Engine air flow may be controlled as shown in the sequence of FIG. 3 during conditions of throttle degradation to improve vehicle drivability while limiting engine torque. The sequence shown in FIG. 3 may be provided according to the method of FIG. 4 in cooperation with the system of FIGS. 1 and 2.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIG. 2. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example fuel system 175 is shown in detail. The fuel system of FIG. 2 may supply fuel to engine 10 shown in detail in FIG. 1. Fuel system 175 includes evaporative emission system 270. The system of FIG. 2 may be operated according to the method of FIG. 4. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a fuel vapor storage canister 202 for storing fuel vapors. Evaporative emissions system 270 also includes carbon 203 for storing and releasing fuel vapors. Fuel vapor storage canister 202 is shown including atmospheric vent line 205 along which normally closed fuel vapor storage canister vent valve (CVV) 213 is placed to selectively allow air to flow into and out of fuel vapor storage canister 202. Fuel vapors may be supplied to fuel vapor storage canister 202 via conduit 208 and normally open fuel tank vapor blocking valve (VBV) 219. Fuel vapors may be purged to engine intake manifold 44 via fuel vapor canister purge valve (CPV) 204 which allows fluidic communication between fuel vapor storage canister 202 and engine intake manifold 44 or intake 42 (shown in FIG. 1) via conduit 207.

Engine 10 includes a fuel rail 220 that supplies fuel to direct fuel injector 66. Fuel vapors may be inducted into intake manifold 44 or intake 42 when intake manifold pressure is below atmospheric pressure. Fuel 231 is supplied from fuel tank 230 by fuel pump 252 to fuel rail 220. Pressure in fuel tank 232 may be measured via fuel tank pressure transducer (FTPT) 241 and relayed to controller 12. Controller 12 may receive inputs from the sensors described in FIG. 1 as well as sensor 241. Controller 12 also activates and deactivates CPV 204, CVV 213, VBV 219, and pump 252 in response to fuel system and engine operating conditions.

Figure 4:
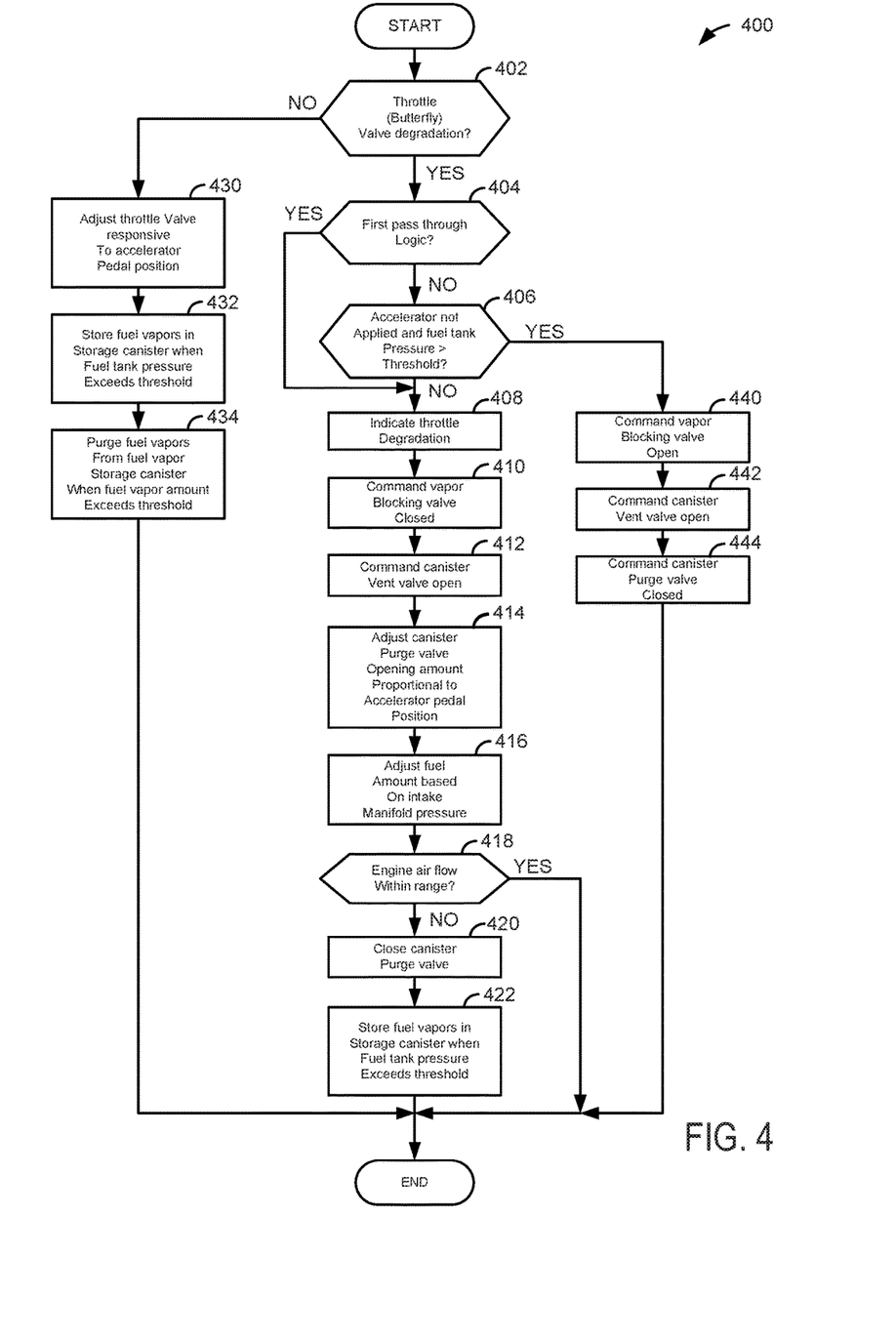
FIG. 4 is an example method for controlling an engine during conditions of throttle degradation.

In one example, the system of FIG. 2 operates according to the method of FIG. 4 via executable instructions stored in non-transitory memory of controller 12. While engine 10 is operating, fuel vapors from fuel tank 230 may be stored in fuel vapor storage canister 202 in response to temperatures in fuel tank 230 increasing.

Fuel vapors from fuel tank 230 may push air out of normally open CVV 213 when temperature and/or pressure in fuel tank 230 is increasing. If engine 10 is operating while vapors are being directed to fuel vapor storage canister 202, CPV 204 may be opened so that fuel vapors are drawn into and combusted in engine 10. If engine 10 is not operating or if CPV 204 is closed, fuel vapor may flow into fuel vapor storage canister 202 if temperature and/or pressure in fuel tank 230 increases such that fuel vapors flow to and are stored in fuel vapor storage canister 202.

On the other hand, if engine 10 is not operating or if CPV 204 is closed while temperature and/or pressure in fuel tank 230 is decreasing, fuel vapors from fuel vapor canister 202 may condense in fuel tanks 230 when VBV 219 is open. VBV 219 may be a normally open valve that is closed when CPV is open to improve vacuum formation in canister 202, thereby improving evacuation of fuel vapors from fuel vapor storage canister 202. Thus, the fuel system shown in FIG. 2 provides a way of decreasing a volume of the fuel vapor emissions system that is purged so that fuel vapor canister purging may be improved.

Controller 12 may indicate a condition of degradation of the throttle, CPV, VBV, and/or CVV on a display panel 251. Alternatively, 251 may be a light or other device to indicate degradation within the system.

The system of FIGS. 1 and 2 provides for an engine system, comprising: an engine including an air intake and a throttle positioned along the air intake downstream of an air filter and upstream of an intake manifold; a fuel vapor storage canister; a canister purge valve positioned along a conduit extending from the fuel vapor storage canister to the intake manifold; an accelerator pedal; and a controller including executable instructions stored in non-transitory memory to adjust a position of the canister purge valve proportional to a position of the accelerator pedal in response to a condition of degradation of the throttle.

In some examples, the engine system further comprises a fuel tank and additional instructions to close the canister purge valve in response to the accelerator pedal not being applied and pressure in the fuel tank being greater than a threshold. The engine system further comprises additional instructions to close a fuel tank vapor blocking valve via the controller in response to the accelerator pedal being applied, and additional instructions to open the fuel tank vapor blocking valve via the controller in response to the accelerator pedal not being applied. The engine system further comprises a fuel vapor storage canister vent valve and a fuel tank vapor blocking valve. The engine system further comprising additional instructions to open the fuel vapor storage canister vent valve and close the fuel vapor blocking valve via the controller in response to the condition of degradation of the throttle. The engine system further comprises additional instructions to close and not open the throttle via the controller in response to the condition of degradation of the throttle.

Referring now to FIG. 3, plots of various simulated signals during hypothetical throttle degradation is shown. The operating sequence may be performed via the system of FIGS. 1 and 2 in cooperation with the method of FIG. 4. Vertical lines at times T0-T5 represent times of interest during the sequence. The plots in FIG. 3 are time aligned and occur at the same time.

The first plot from the top of FIG. 3 is a plot of central or engine throttle state versus time. The vertical axis represents engine throttle state and the engine throttle is in a degraded state when the trace is at a higher level near the vertical axis arrow. The engine throttle is not in a degraded state when the trace is near the horizontal axis (not visible). The horizontal axis represents time and time increases from the left side of the figure to the right side of the figure.

The second plot from the top of FIG. 3 is a plot of CPV average opening amount. In one example, the CPV may be opened and closed at a frequency and duty cycle so that the CPV is open an average amount. Alternatively, the CPV may be adjusted to a plurality of positions between full open and full closed to provide the opening amount shown in the second plot. The CPV is closed when the trace is near the horizontal axis. The CPV is full open when the trace is near the vertical axis arrow. The horizontal axis represents time and time increases from the left side of the figure to the right side of the figure.

The third plot from the top of FIG. 3 is a plot of accelerator pedal position versus time. The vertical axis represents accelerator pedal position and the accelerator pedal position increases (e.g., is applied and displaced further from its base fully released position) in the directly of the vertical axis arrow. The horizontal axis represents time and time increases from the left side of the figure to the right side of the figure.

The fourth plot from the top of FIG. 3 is a plot of throttle position versus time. The vertical axis represents throttle position and the throttle is open a greater amount when the trace is at a higher level near the vertical axis arrow. The horizontal axis represents time and time increases from the left side of the figure to the right side of the figure.

The fifth plot from the top of FIG. 3 is a plot of VBV operating state versus time. The VBV is open when the trace is at a higher level near the vertical axis arrow. The VBV is closed when the trace is at a lower level near the horizontal axis arrow. The horizontal axis represents time and time increases from the left side of the figure to the right side of the figure.

The sixth plot from the top of FIG. 3 is a plot of CVV operating state versus time. The CVV is open when the trace is at a higher level near the vertical axis arrow. The CVV is closed when the trace is at a lower level near the horizontal axis. The horizontal axis represents time and time increases from the left side of the figure to the right side of the figure.

At time T0, the central engine throttle that regulates air flow from an engine air filter to an engine intake manifold is not degraded. The CPV valve is not open and the accelerator pedal is applied to a middle level. The engine throttle position is at a middle level and the VBV is in an open state. The CVV is also in an open state. The VBV and CVV may be open when vapors from the fuel tank are being stored in the fuel vapor storage canister. Fuel vapors may be stored in the fuel vapor storage canister when pressure in the fuel tank exceeds a threshold level.

At time T1, the VBV is closed and the CVV remains open. The central engine throttle is not in a degraded state and the CPV begins to open. The accelerator pedal and throttle remain at middle levels. Such conditions may be indicative of purging fuel vapors to the engine. The purging of fuel vapors from the fuel vapor storage canister to the engine may commence when an amount of fuel vapor stored in the fuel vapor storage canister exceeds a threshold amount.

At time T2, the CPV is closed and the CVV is also closed in response to fuel vapors stored in the fuel vapor storage canister being less than a threshold amount. The central throttle is not in a degraded condition and the VPV remains closed. The accelerator pedal and the throttle position remain at middle levels.

At time T3, the central throttle state transitions from a lower level to a higher level to indicate throttle degradation.

Throttle degradation may be asserted based on output of a sensor or output of an actuator not being within an expected range. The throttle is commanded to a closed state where the throttle plate butts up against a stop in response to the indication of throttle degradation. Engine air flow (e.g., air flow into the engine from the engine air intake) is restricted to less than a threshold amount when the throttle is butted up against the stop. In this way, engine torque may be limited. Additionally, the CVV is commanded open and the VBV is commanded closed. The CPV may also be commanded closed in response to the indication of throttle degradation.

Between time T3 and time T4, the driver applies the accelerator pedal after noticing a reduction of engine power. The throttle does not respond to the accelerator pedal, but the CPV opens in response to the accelerator pedal position and the indication of throttle degradation. In particular, the CPV may be opened in proportion to the application of the accelerator pedal. Alternatively, there may be an affine relationship between the CPV opening amount and the accelerator pedal position. By opening the CPV while the CVV is open and the VBV is closed, fuel vapors are restricted from entering the engine while air is allowed to flow into the engine. The engine air amount is based on the accelerator pedal position, but the air is delivered responsive to the accelerator pedal via the CPV. Additionally, a small amount of air may also pass through the throttle even though the throttle remains closed and butted against the throttle stop. In this way, the amount of air entering an engine may be increased responsive to accelerator pedal position during conditions where a central throttle is degraded.

At time T4, the driver releases the accelerator pedal and the CPV is closed in response to the accelerator pedal being fully released. Additionally, the VBV is opened in response to the closed CPV or not applied accelerator pedal and pressure in the fuel tank exceeding a threshold amount (not shown). Consequently, fuel vapors from the fuel tank may be stored in the fuel vapor storage canister even if throttle degradation is present. However, in some examples, the fuel tank pressure threshold may be increased in response to degraded throttle conditions so that the purging fuel vapors to the fuel vapor storage canister is less likely. The fuel vapors may be stored to the fuel vapor storage canister after the engine is stopped so that engine cylinders are not supplied an excess amount of fuel, which may stall the engine.

At time T5, the driver applies the accelerator pedal and the VBV is closed in response to applying the accelerator pedal so that the engine may be supplied air via the CPV. The CPV opens in response to applying the accelerator pedal. In this way, the fuel vapor control system may transition between supplying air to the engine to storing fuel vapors from a fuel tank in a fuel vapor storage canister in response to accelerator pedal position irrespective of intake manifold pressure.

Referring now to FIG. 4, an example flow chart for a method for operating an engine is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 judges if degradation of the vehicle's central throttle (e.g., 62 of FIG. 1) is present. In one example, throttle degradation may be based on output values of the throttle position sensor or other sensors. If method 400 judges that throttle degradation is present, the answer is yes and method 400 proceeds to 404. Otherwise, the answer is no and method 400 proceeds to 430.

At 430, method 400 adjusts the central throttle responsive to accelerator pedal position. In one example, accelerator pedal position is input to a transfer function and the transfer function outputs a desired torque amount. An engine air amount is determined from the desired torque amount and the central throttle position is adjusted to provide the desired torque amount. Method 400 proceeds to 432.

At 432, method 400 selectively stores fuel vapors from the vehicle's fuel tank into a fuel vapor storage canister. Fuel vapors may be stored in the fuel vapor storage canister in response to pressure in the fuel tank. Fuel vapors may flow from the fuel tank the to fuel vapor storage canister via opening the CVV, closing the CPV, and opening the VBV. Method 400 proceeds to 434.

At 434, method 400 selectively purges fuel vapors from the vehicle's fuel vapor storage canister to the engine. Fuel vapors may be purged in response to pressure in the fuel vapor storage canister. Fuel vapors may flow from the fuel vapor storage canister to the engine via opening the CVV, opening the CPV, and closing the VBV. Method 400 proceeds to exit.

At 404, method 400 judges if method 400 is taking a first past through the logic beyond 402 (e.g., 406-422 and 440-444) since throttle degradation was indicated. In one example, a variable in memory is used to track whether or not method 400 has proceeded past 402. For example, the variable may change in value from zero to 1 when method 400 has moved to 404 for a first time. If method 400 judges that it is the first time through the logic to 404 the answer is yes and method 400 proceeds to 408. Otherwise, the answer is no and method 400 proceeds to 406. Additionally, method 400 may command the CPV closed if the answer is yes.

At 406, method 400 judges if the accelerator pedal is not applied and if fuel tank pressure is greater than a threshold pressure. If the accelerator pedal is in its base released position, it is not applied and the answer is yes, so method 400 proceeds to 440. Otherwise, the answer is no and method 400 proceeds to 408.

At 408, method 400 indicates throttle degradation. Throttle degradation may be indicated by setting a value of a bit or word in memory to a specific value (e.g., changing a value of a bit from zero to one). Further, throttle degradation may be indicated by displaying the indication to a driver via a human/machine interface (e.g., 251 of FIG. 2). Method 400 proceeds to 410.

At 410, method 400 closes the fuel vapor blocking valve (VBV). The VBV is closed so that fuel vapors will not flow to the engine, thereby reducing the possibility of engine stalling due to a rich air-fuel mixture. Method 400 proceeds to 412.

At 412, method 400 opens the fuel vapor storage canister vent valve (CVV) open. By opening the CVV ambient air may be drawn into the engine. Method 400 proceeds to 414.

At 414, method 400 adjusts an opening amount of the CPV proportionate to accelerator pedal position. Alternatively, the CPV may be adjusted so that there is an affine relationship between the CPV opening amount and the accelerator pedal position. For example, if the driver is requesting ten percent of available engine torque, the CPV opening amount is opened to ten percent of its full opening amount. In some examples where the CPV opening amount is adjusted via a pulse width modulated signal, the average CPV opening amount may be adjusted proportionate to or in an affine relationship with accelerator pedal position. Method 400 proceeds to 416.

At 416, method 400 adjusts an amount of fuel supplied to the engine responsive to intake manifold pressure and engine speed. Further, method 400 determines the engine air flow amount based on engine speed and intake manifold pressure as is known in the art. Method 400 proceeds to 418.

At 418, method 400 judges if engine air flow is within a predetermined range. The predetermined range may be based on the desired CPV opening amount. If method 400 judges that the engine air flow is within the predetermined range, the answer is yes and method 400 proceeds to exit. Otherwise, the answer is no and method 400 proceeds to 420.

At 420, method 400 closes the CPV. The CPV may be closed to further limit engine torque if the engine air flow is not in a desired range. Further, the CVV may be closed. Method 400 proceeds to 422.

At 422, method 400 selectively opens the VBV and the CVV if fuel tank pressure exceeds a threshold pressure. Otherwise, the VBV and CVV are held closed. By opening the VBV and the CVV, fuel vapors may be stored in the fuel vapor storage canister so that pressure in the fuel tank may be relieved. Method 400 proceeds to exit.

At 440, method 400 commands and opens the VBV. By opening the VBV pressure in the fuel tank may be relieved. Method 400 proceeds to 442.

At 442, method 400 commands and opens the CVV. Opening the CVV allows air originating in the fuel tank to be stripped of hydrocarbons and exit to ambient atmosphere, thereby reducing pressure in the fuel tank during conditions where engine air flow is not within a predetermined range. Method 400 proceeds to 444.

At 444, method 400 commands the CPV closed. The CPV is closed so that fuel vapors do not flow to the engine while there is throttle degradation and engine air flow that is not within a predetermined range. Method 400 proceeds to exit.

In this way, greater amounts of engine air flow may be provided during conditions of throttle degradation. However, if engine air flow is not within an expected range, the CPV may be closed so that the engine provide less torque, yet allows the vehicle to continue to travel down the road it is traveling. The engine continues to combust air and fuel during throttle degradation of the engine is commanded on.

The method of FIG. 4 provides for an engine control method, comprising: opening a fuel vapor storage canister vent valve and closing a fuel tank vapor blocking valve via a controller in response to an indication of degradation of a throttle that regulates air flow from an engine air intake filter to cylinders of an engine. The method includes where the fuel vapor canister vent valve is positioned along a conduit extending between atmosphere and a fuel vapor storage canister. The method includes where the fuel tank vapor blocking valve is positioned along a conduit extending between a fuel tank and a fuel vapor storage canister. The method further comprises closing the throttle via the controller in response to the indication of degradation. The method further comprises not opening the throttle via the controller in response to a position of an accelerator pedal while indicating degradation of the throttle. The method further comprises not purging fuel vapors from a fuel tank to the engine via the controller while indicating degradation of the throttle. For example, fuel vapors directly from the fuel tank are not purged when the driver is requesting torque via the accelerator pedal. The method further comprises combusting air and fuel in an engine while indicating degradation of the throttle.

The method of FIG. 4 also provides for an engine control method, comprising: opening a fuel vapor canister vent valve, closing a fuel vapor canister purge valve, and closing a fuel tank vapor blocking valve via a controller in response to an indication of degradation of a throttle that regulates air flow from an engine air intake filter to cylinders of an engine; and adjusting an opening amount of the fuel vapor canister purge valve via the controller in response to a position of an accelerator pedal after closing the fuel vapor canister purge valve while indicating degradation of the throttle.

In some examples, the method includes where the controller adjusts an average opening amount of the canister purge valve proportionately with a position of the accelerator pedal. The method further comprises purging fuel vapors from a fuel tank to a fuel vapor storage canister in response to the accelerator pedal not being applied. The method includes where fuel vapors are purged via opening the fuel tank vapor blocking valve, closing the fuel vapor canister purge valve, and opening the fuel vapor canister vent valve. The method further comprises not opening the throttle via the controller in response to a position of an accelerator pedal while indicating degradation of the throttle. The method further comprises not purging fuel vapors from a fuel tank to the engine via the controller while indicating degradation of the throttle and while the accelerator pedal is applied. The method further comprises combusting air and fuel in an engine while indicating degradation of the throttle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
opening a fuel vapor storage canister vent valve and closing a fuel tank vapor blocking valve via a controller in response to an indication of degradation of a throttle that regulates air flow from an engine air intake filter to cylinders of an engine.

2. The method of claim 1, where the fuel vapor canister vent valve is positioned along a conduit extending between atmosphere and a fuel vapor storage canister.

3. The method of claim 1, where the fuel tank vapor blocking valve is positioned along a conduit extending between a fuel tank and a fuel vapor storage canister.

4. The method of claim 1, further comprising closing the throttle via the controller in response to the indication of degradation.

5. The method of claim 4, further comprising not opening the throttle via the controller in response to a position of an accelerator pedal while indicating degradation of the throttle.

6. The method of claim 1, further comprising not purging fuel vapors from a fuel tank to the engine via the controller while indicating degradation of the throttle.

7. The method of claim 1, further comprising combusting air and fuel in an engine while indicating degradation of the throttle.

8. An engine control method, comprising:
opening a fuel vapor canister vent valve, closing a fuel vapor canister purge valve, and closing a fuel tank vapor blocking valve via a controller in response to an indication of degradation of a throttle that regulates air flow from an engine air intake filter to cylinders of an engine; and
adjusting an opening amount of the fuel vapor canister purge valve via the controller in response to a position of an accelerator pedal after closing the fuel vapor canister purge valve while indicating degradation of the throttle.

9. The method of claim 8, where the controller adjusts an average opening amount of the canister purge valve proportionately with a position of the accelerator pedal.

10. The method of claim 8, further comprising purging fuel vapors from a fuel tank to a fuel vapor storage canister in response to the accelerator pedal not being applied.

11. The method of claim 10, where fuel vapors are purged via opening the fuel tank vapor blocking valve, closing the fuel vapor canister purge valve, and opening the fuel vapor canister vent valve.

12. The method of claim 8, further comprising not opening the throttle via the controller in response to a position of an accelerator pedal while indicating degradation of the throttle.

13. The method of claim 8, further comprising not purging fuel vapors from a fuel tank to the engine via the controller while indicating degradation of the throttle and while the accelerator pedal is applied.

14. The method of claim 8, further comprising combusting air and fuel in an engine while indicating degradation of the throttle.

15. An engine system, comprising:
an engine including an air intake and a throttle positioned along the air intake downstream of an air filter and upstream of an intake manifold;
a fuel vapor storage canister;
a canister purge valve positioned along a conduit extending from the fuel vapor storage canister to the intake manifold;
an accelerator pedal; and
a controller including executable instructions stored in non-transitory memory to adjust a position of the canister purge valve proportional to a position of the accelerator pedal in response to a condition of degradation of the throttle.

16. The engine system of claim 15, further comprising a fuel tank and additional instructions to close the canister purge valve in response to the accelerator pedal not being applied and pressure in the fuel tank being greater than a threshold.

17. The engine system of claim 15, further comprising additional instructions to close a fuel tank vapor blocking valve via the controller in response to the accelerator pedal being applied, and additional instructions to open the fuel tank vapor blocking valve via the controller in response to the accelerator pedal not being applied.

18. The engine system of claim 15, further comprising a fuel vapor storage canister vent valve and a fuel tank vapor blocking valve.

19. The engine system of claim 18, further comprising additional instructions to open the fuel vapor storage canister vent valve and close the fuel vapor blocking valve via the controller in response to the condition of degradation of the throttle.

20. The engine system of claim 15, further comprising additional instructions to close and not open the throttle via the controller in response to the condition of degradation of the throttle.

* * * * *